(12) United States Patent
Keshavaraj

(10) Patent No.: US 7,549,669 B2
(45) Date of Patent: Jun. 23, 2009

(54) MULTI-ZONE AIR BAG CURTAIN

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 489 days.

(21) Appl. No.: 11/139,416

(22) Filed: May 27, 2005

(65) Prior Publication Data
US 2006/0163849 A1 Jul. 27, 2006

Related U.S. Application Data

(63) Continuation-in-part of application No. 11/040,383, filed on Jan. 21, 2005.

(51) Int. Cl.
B60R 21/233 (2006.01)
B60R 21/16 (2006.01)

(52) U.S. Cl. .................. 280/729; 280/730.2; 280/743.1

(58) Field of Classification Search ................ 280/729, 280/730.2, 743.1
See application file for complete search history.

(56) References Cited

U.S. PATENT DOCUMENTS

| 5,730,464 | A | * | 3/1998 | Hill | 280/743.2 |
| 5,788,270 | A | * | 8/1998 | Håland et al. | 280/729 |
| 5,899,491 | A | * | 5/1999 | Tschaeschke | 280/730.2 |
| 6,010,149 | A | * | 1/2000 | Riedel et al. | 280/730.2 |
| 6,099,029 | A | * | 8/2000 | Håland et al. | 280/729 |
| 6,158,767 | A |   | 12/2000 | Sinnhuber | 280/730.2 |
| 6,217,060 | B1 |   | 4/2001 | Mangold et al. | 280/730.2 |
| 6,237,941 | B1 |   | 5/2001 | Bailey et al. | 280/730.2 |
| 6,237,943 | B1 |   | 5/2001 | Brown et al. | 280/730.2 |
| 6,361,069 | B1 |   | 3/2002 | Saito et al. | 280/730.2 |
| 6,371,512 | B1 | * | 4/2002 | Asano et al. | 280/730.2 |
| 6,454,298 | B1 | * | 9/2002 | Hardig et al. | 280/730.2 |
| 6,457,742 | B1 | * | 10/2002 | Brucker | 280/730.2 |
| 6,489,006 | B1 |   | 12/2002 | Keshavaraj | 428/125 |
| 6,517,104 | B1 |   | 2/2003 | Patel | 280/730.2 |
| 6,594,570 | B2 |   | 7/2003 | Nagao et al. | 701/45 |
| 6,595,546 | B2 |   | 7/2003 | Smith | 280/736 |
| 6,631,921 | B1 | * | 10/2003 | Drossler et al. | 280/730.2 |
| 6,631,922 | B2 |   | 10/2003 | Hess et al. | 280/730.2 |
| 6,644,687 | B2 | * | 11/2003 | Saito et al. | 280/730.2 |
| 6,648,368 | B2 | * | 11/2003 | Smith et al. | 280/730.2 |
| 6,695,341 | B2 | * | 2/2004 | Winarto et al. | 280/730.2 |
| 6,705,640 | B2 | * | 3/2004 | Takahashi | 280/730.2 |
| 6,805,374 | B2 |   | 10/2004 | Saderholm et al. | 280/730.2 |
| 6,820,898 | B2 |   | 11/2004 | Dinsdale et al. | 280/737 |
| 6,886,857 | B1 | * | 5/2005 | Mishina et al. | 280/743.1 |
| 6,913,282 | B2 | * | 7/2005 | Takahashi | 280/730.2 |
| 7,025,378 | B2 | * | 4/2006 | Wang | 280/730.2 |
| 7,048,301 | B2 | * | 5/2006 | Walsh | 280/730.2 |

(Continued)

FOREIGN PATENT DOCUMENTS

EP 1 352 793 A2 10/2003

(Continued)

Primary Examiner—Paul N. Dickson
Assistant Examiner—Barry Gooden, Jr.
(74) Attorney, Agent, or Firm—Cheryl J. Brickey

(57) ABSTRACT

An air bag curtain that incorporates at least a pair of substantially discrete inflation zones within the curtain structure such that upon failure or disengagement of one inflation zone, at least one other inflation zone remains operative.

3 Claims, 4 Drawing Sheets

U.S. PATENT DOCUMENTS

| | | | |
|---|---|---|---|
| 7,114,744 B2 * | 10/2006 | Sunabashiri | 280/730.2 |
| 2002/0020992 A1 * | 2/2002 | Kanuma | 280/730.2 |
| 2002/0105173 A1 | 8/2002 | Saderholm et al. | 280/730.2 |
| 2002/0158450 A1 | 10/2002 | Hoeft et al. | 280/730.2 |
| 2002/0195808 A1 * | 12/2002 | Chiou et al. | 280/743.1 |
| 2003/0006590 A1 * | 1/2003 | Aoki et al. | 280/730.2 |
| 2003/0052477 A1 * | 3/2003 | Challa et al. | 280/730.2 |
| 2003/0132619 A1 * | 7/2003 | Winarto et al. | 280/730.2 |
| 2003/0132620 A1 * | 7/2003 | Kawasaki et al. | 280/730.2 |
| 2003/0141708 A1 | 7/2003 | Enders | 280/730.2 |
| 2003/0178827 A1 | 9/2003 | Dinsdale et al. | 280/736 |
| 2003/0178829 A1 | 9/2003 | Dinsdale et al. | 280/741 |
| 2003/0184060 A1 * | 10/2003 | Smith et al. | 280/730.2 |
| 2003/0205888 A1 | 11/2003 | Keshavaraj | 280/730.2 |
| 2003/0234523 A1 | 12/2003 | Henderson et al. | 280/730.2 |
| 2004/0096673 A1 * | 5/2004 | Aketa et al. | 428/447 |
| 2004/0100076 A1 | 5/2004 | Holtz | 280/730.2 |
| 2004/0108694 A1 | 6/2004 | Takahashi | 280/730.2 |
| 2004/0113400 A1 | 6/2004 | Weber | 280/730.2 |
| 2005/0006882 A1 * | 1/2005 | Wang | 280/730.2 |
| 2005/0082797 A1 * | 4/2005 | Welford et al. | 280/730.2 |

FOREIGN PATENT DOCUMENTS

| | | |
|---|---|---|
| JP | 11-208410 | 8/1999 |
| JP | 2001001854 A * | 1/2001 |

* cited by examiner

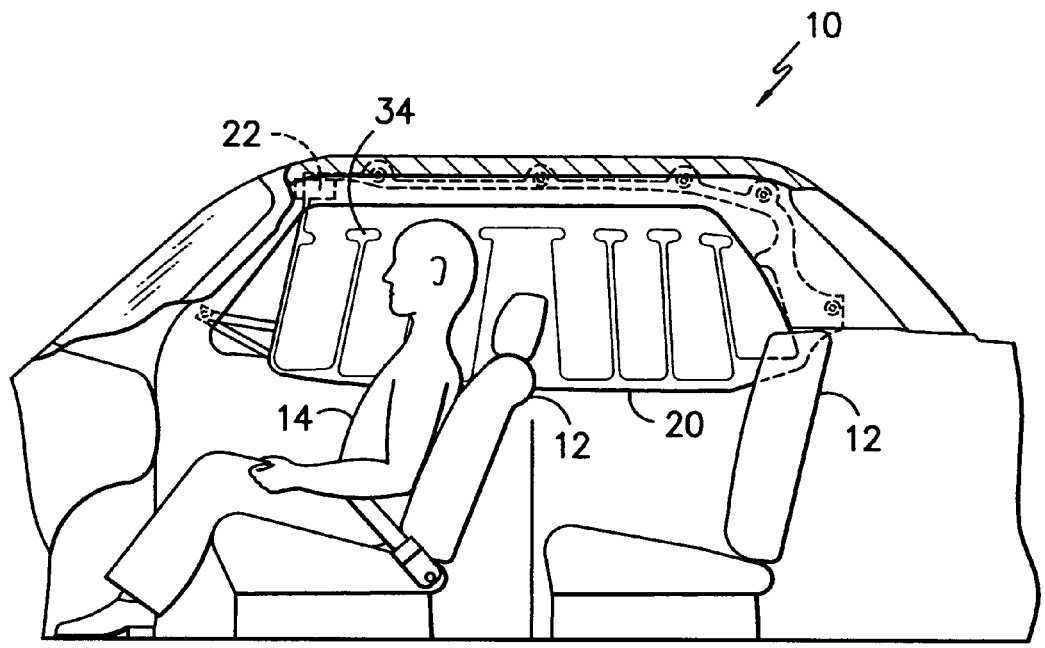
FIG. -1-
PRIOR ART
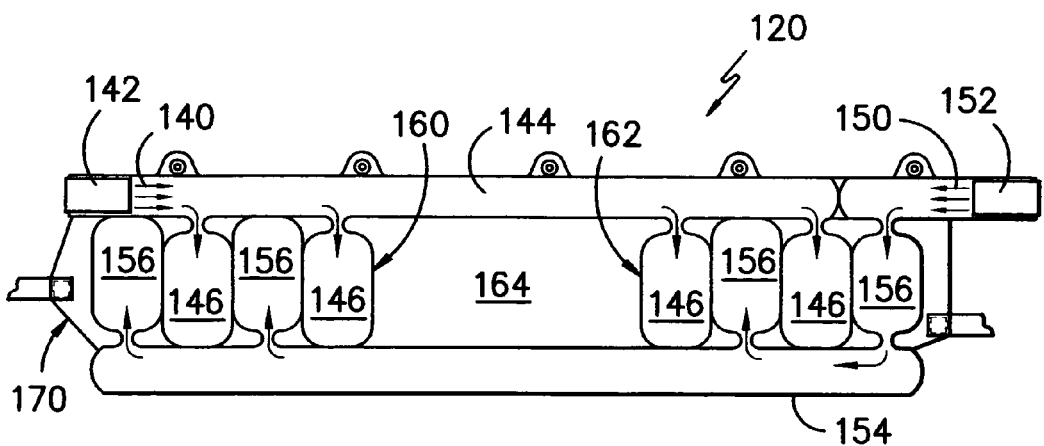
FIG. -2-

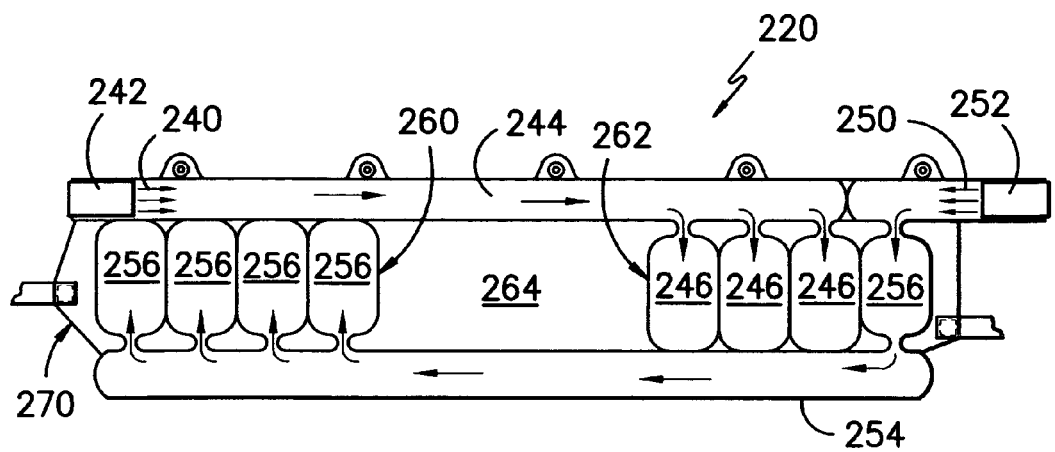
FIG. -3-
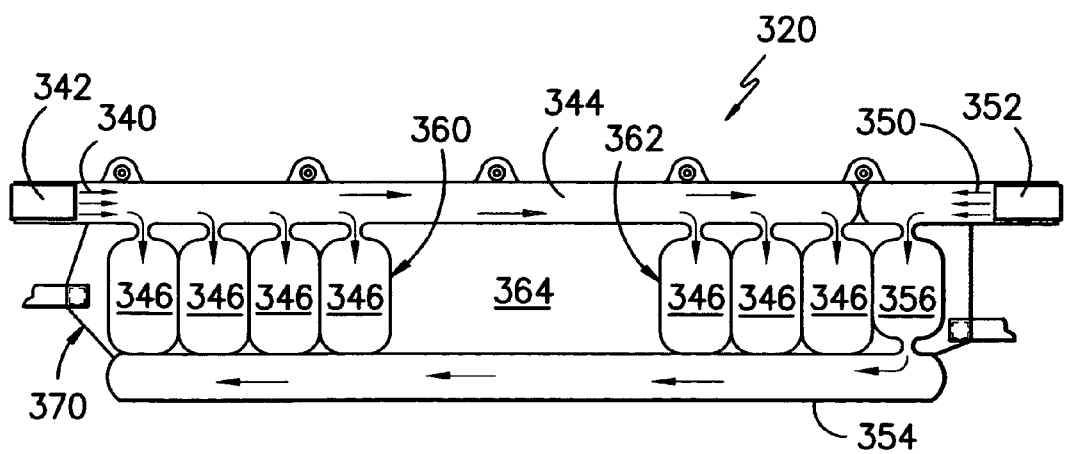
FIG. -4-

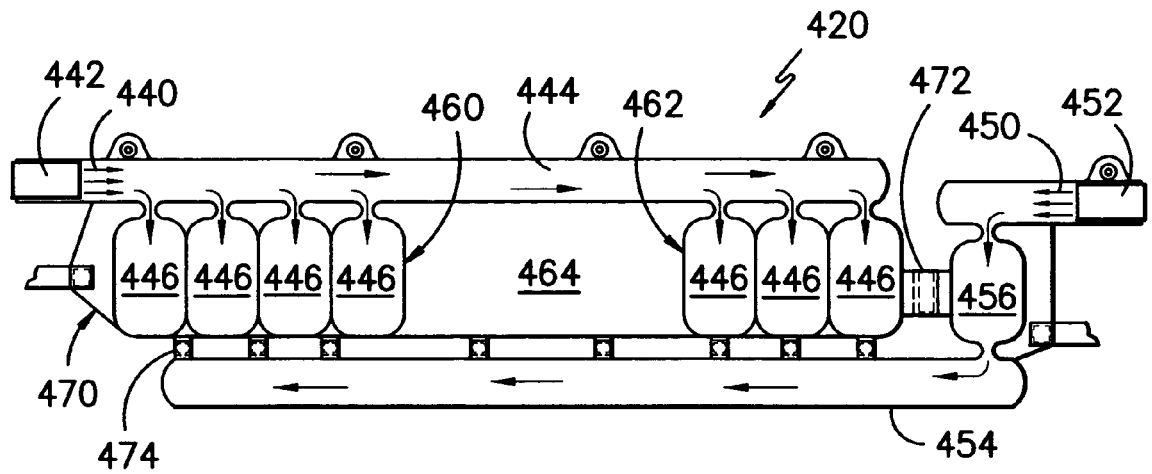
FIG. —5—
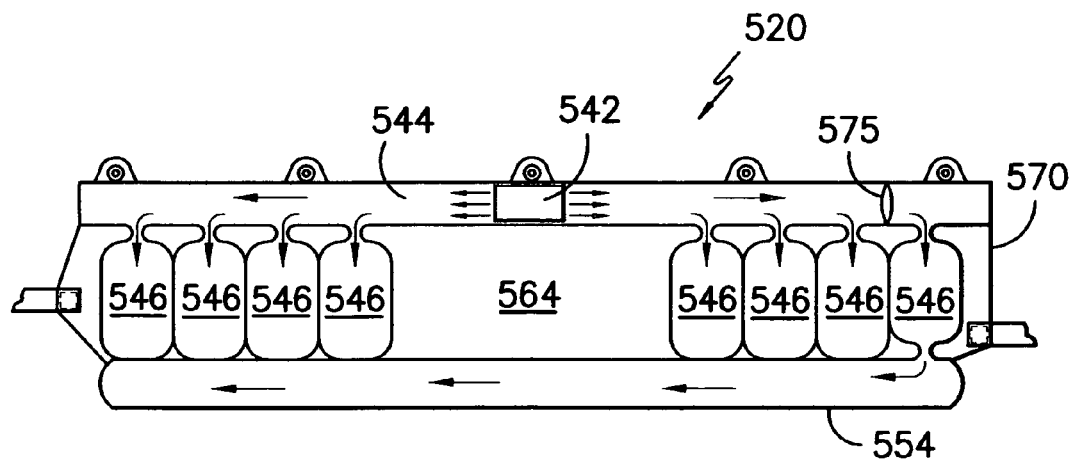
FIG. —6—

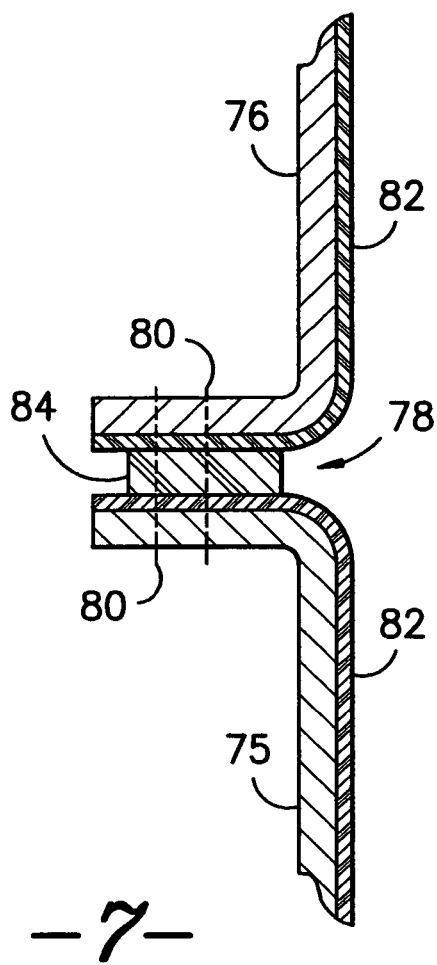
FIG. -7-
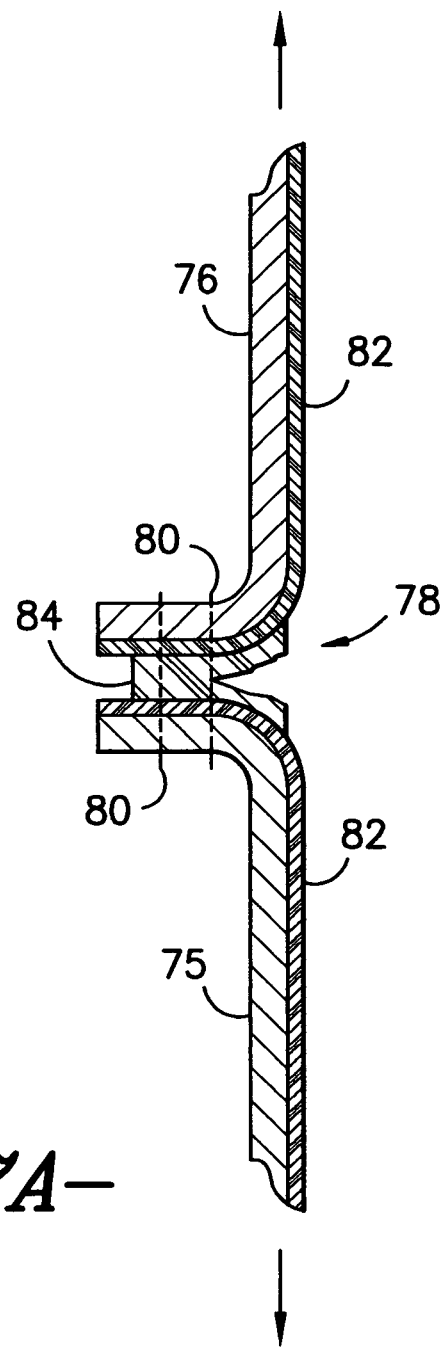
FIG. -7A-

MULTI-ZONE AIR BAG CURTAIN

CROSS REFERENCE TO RELATED APPLICATION

This application is a continuation-in-part of my co-pending application Ser. No.11/040,383 filed on Jan. 21, 2005. The contents of this earlier filed application are hereby incorporated by reference as if fully set forth herein.

TECHNICAL FIELD

This invention relates generally to vehicle air bags and more particularly to air bag curtains adapted for deployment across extended interior side portions of a vehicle during a side impact and/or roll over event wherein the curtain remains operative upon failure of a portion of the curtain and/or disengagement of an inflator feeding a portion of the curtain.

BACKGROUND OF THE INVENTION

An air bag safety restraint in the form of an inflatable restraining curtain disposed along the side of a vehicle between an occupant and window or door openings plays a well recognized role in preventing injury to the occupant during a collision event. Typically, such air bags are inflated rapidly by the pressure of a reaction gas released from an inflator at the outset of the collision event. This gas generation typically takes place when a gas-generating agent in an inflator induces a chemical reaction activated by a collision signal from a collision detecting sensor. The gas which is generated by the inflator is then conveyed to the air bag. Inflatable restraint curtains are typically deployed downwardly from a storage position along the roof rail so as to at least partially cover window and/or door openings across the side of the vehicle. The deployed curtain thus provides both a degree of cushioning restraint as well as a barrier preventing the occupant from being ejected from the vehicle. Due to the extended duration of a roll-over collision event where the vehicle may turn over several times, it is desirable for the curtain-type air bags to remain in inflated tension for an extended period of time so as to maintain a degree of head protection and barrier restraint until the entire event is concluded. Preferably, such curtain-type restraint cushions remain inflated for about 6 seconds or more.

Air bag cushions formed by sewing together panels of fabric typically cannot maintain inflation for extended periods of time. Performance can be improved by applying substantial quantities of permeability blocking coating materials. However, applying sufficient coating weights to the fabric layers gives rise to substantial weight increase and bulk thereby increasing cost and making storage more difficult. Since the gas release in a sewn air bag is predominately at the seams, one solution that has been utilized is to weave the air bag as a one piece structure on a Jacquard loom and to then apply a relatively heavy layer of permeability blocking coating to cover the entire structure including the woven in seams. While Jacquard weaving has provided bag structures meeting desired performance requirements, the practice is nonetheless relatively expensive and inefficient to carry out. Moreover, even with woven in seams, air bags such as curtain type bags that are required to maintain inflation for extended periods may still require relatively high coating weights.

The ability to maintain tension-inducing pressure in sewn air bag curtains of large volume has been particularly problematic. Such curtains are used in vehicles of extended length such as sport utility vehicles, vans and the like.

SUMMARY OF THE INVENTION

The present invention provides advantages and/or alternatives over the prior art by providing an air bag curtain that incorporates at least a pair of discrete inflation zones within the curtain structure fed by common or discrete inflators such that upon failure or disengagement of one inflation zone and/or inflator, at least one other inflation zone remains operative. The inventive concept is applicable to curtain structures for extended length as well as shorter length vehicles.

According to one aspect, an air bag curtain is provided having an inflatable gas transmission bolster extending adjacent the upper edge of the curtain in fluid communication with a first inflator. The gas transmission bolster is in fluid communication with a first group of inflation cells within the curtain. The curtain also includes an inflatable tensioning cell disposed adjacent a lower edge. The tensioning cell is in fluid communication with a second inflator. Optionally, at least portions of the curtain may be formed from panels of material joined together by sewn seams. A sealant of defined character may be disposed at the interior of the sewn seams to block gas leakage for an extended period of time upon inflation of the air bag when the seams are placed in tension.

According to another aspect, an air bag curtain is provided having an inflatable gas transmission bolster extending adjacent the upper edge of the curtain in fluid communication with a first inflator. The gas transmission bolster is in fluid communication with a first group of inflation cells within the curtain. The curtain also includes an inflatable tensioning cell disposed adjacent a lower edge. The tensioning cell is in fluid communication with a second inflator as well as with a second group of inflation cells within the curtain. Optionally, at least portions of the curtain may be formed from panels of material joined together by sewn seams. A sealant of defined character may be disposed at the interior of the sewn seams to block gas leakage for an extended period of time upon inflation of the air bag when the seams are placed in tension.

According to another aspect an air bag curtain is provided having an inflatable gas transmission bolster extending adjacent the upper edge of the curtain in fluid communication with an inflator. The gas transmission bolster is in fluid communication with a first group of inflation cells within the curtain. The curtain also includes an inflatable tensioning cell disposed adjacent a lower edge. The tensioning cell is in fluid communication with the gas transmission bolster through a check valve such that upon the occurrence of predefined conditions gas may be transferred from the inflator into both the gas transmission bolster and the lower edge tensioning cell with return gas flow being blocked by the check valve. Optionally, at least portions of the curtain may be formed from panels of material joined together by sewn seams. A sealant of defined character may be disposed at the interior of the sewn seams to block gas leakage for an extended period of time upon inflation of the air bag when the seams are placed in tension.

According to one potentially preferred feature, sewn seams within the air bag curtain are sealed at the interior between adjoined layers by a low modulus, high elongation polymeric sealant surrounding at least a portion of the sewing threads. Due to the low modulus and high elongation characteristics of the sealant it fails under tension in a cohesive manner by tearing through the interior of the sealant layer while remaining adhered to the fabric thereby maintaining gas blockage even when the seam is placed in tension.

BRIEF DESCRIPTION OF THE DRAWINGS

The accompanying drawings which are incorporated in and which constitute a portion of this specification illustrate an exemplary embodiment of the invention which, together with the detailed description set forth below will serve to explain the principles of the invention wherein;

FIG. 1 illustrates a cut-away view of a transportation vehicle illustrating an inflatable air bag cushion in deployment to the side of the occupant;

FIG. 2 is a cut-away view illustrating an embodiment of a side curtain air bag curtain adapted to provide continued protection upon failure at inflation zones within the curtain;

FIG. 3 is a view similar to FIG. 2 illustrating an alternative arrangement of inflation zones;

FIG. 4 is a cut-away view illustrating an embodiment of a side curtain air bag curtain adapted to provide continued protection upon failure at inflation zones within the curtain wherein lower edge tensioning inflation is substantially discrete from impact-absorbing body inflation;

FIG. 5 is a view similar to FIG. 4, wherein a lower edge tensioning cell is spaced from the body of the curtain;

FIG. 6 is a cut-away view illustrating an embodiment of a side curtain air bag curtain adapted to provide continued protection upon failure at inflation zones within the curtain wherein a lower edge tensioning cell portion and an impact absorbing body portion are inflatable by a common inflator with backflow of inflation gas blocked by a one way valve;

FIG. 7 is a cut-through view of a generic seam construction securing together two panels of material with an interior sealant layer; and FIG. 7A is a view similar to FIG. 6 with the seam under tension;

DESCRIPTION OF PREFERRED EMBODIMENTS

Reference will now be made to the drawings wherein, to the extent practical like elements are denoted by like reference numerals in the various views. Turning to FIG. 1 the interior of a transportation vehicle 10 is shown. As will be appreciated, the transportation vehicle may have any number of configurations such as a car, truck, van, sport utility vehicle or the like. Regardless of the actual vehicle configuration, it will include rows of seats 12 for supporting occupants 14.

As illustrated, the vehicle 10 includes an air bag in the form of an inflatable curtain 20 for use with an inflator 22 to protect the occupant 14 during a side impact and/or prolonged roll-over collision event. In operation, upon inflation the inflatable curtain 20 deploys downwardly from a storage position along the roof rail of the vehicle 10 into the illustrated position to the side of the occupant 14. As the curtain 20 is inflated it undergoes a natural shortening in its length dimension thereby causing it to be held in tension between structural pillars of the vehicle 10. For simplicity of illustration, the curtain 20 is illustrated as extending between the so called "A" pillar and "C" pillar of the vehicle 10. However, in the event that additional seating rows are utilized, the curtain 20 may likewise extend between pillars spaced further apart such as between the "A" pillar and "D" pillar in an extended length sport utility vehicle or the like. As will be appreciated, the curtain 20 is typically formed from two opposing mirror image panels of material such as a woven textile fabric joined along a perimeter seam. As illustrated, additional adjoining seams may be applied at the interior of the curtain 20 so as to define an arrangement of so called zero length tethers 34 to control gas flow and deployment characteristics within the inflatable curtain 20.

Regardless of the actual configuration, it is generally desirable for an air bag curtain to provide a degree of cushioning for head impact protection while also forming a resilient barrier to aid in containing the occupant 14 within the vehicle during an extended roll-over. The present invention provides a system that achieves these goals even if a portion of the curtain becomes torn or otherwise loses the ability to retain gas pressure.

A first exemplary embodiment of an air bag curtain 120 in accordance with the present invention is illustrated in FIG. 2. In this embodiment the curtain 120 includes a first mouth opening 140 operatively connected to a first inflator 142. As illustrated, the first inflator 142 is dedicated to delivery of inflation gas into the first mouth opening 140 and thereafter through a gas transmission bolster 144 extending adjacent an upper edge of the curtain 120 at least partially along its length. In operation, the gas transmission bolster will preferably be disposed in the vicinity of the vehicle roof rail. The gas transmission bolster 144 in turn feeds into a first group of inflation cells 146 arranged in a predefined pattern at selected locations along the length of the curtain. Thus, upon activation of the first inflator 142, the gas transmission bolster 144 and the first group of inflation cells 146 are rapidly inflated to provide impact protection. The inflation of the first group of inflation cells 146 also causes the curtain to unfold downwardly away from its stored position along the vehicle roof rail.

According to the illustrated and potentially preferred practice, the curtain 120 also includes a second mouth opening 150 operatively connected to a second inflator 152. As illustrated, the second inflator 152 is dedicated to delivery of inflation gas into the second mouth opening 150 and thereafter through an elongate inflatable tensioning cell 154 disposed adjacent the lower edge of the curtain and into a second group of inflation cells 156 arranged in a predefined pattern at selected locations along the length of the curtain. Thus, upon activation of the second inflator 152, the tensioning cell 154 and the second group of inflation cells 156 are rapidly inflated to provide desired tensioning across the lower edge in combination with side impact protection.

In practice, the gas transmission bolster 144, the inflation cells 146, 156 and the tensioning cell 154 may all be formed by introducing zero length tethers or other flow blocking elements such as sewn seams, woven seams, adhesive seams, welded seams or the like in a desired pattern between a face surface and a back surface of the curtain 120. As shown, according to one contemplated practice, it is contemplated that individual cell members from the first group of inflation cells 146 may be placed in adjacent relation to one or more individual cell members from the second group of inflation cells 156. Of course, the actual geometry of individual inflation cells may be adjusted as desired. It is also contemplated that cell members from the first and second group may be clustered in combination at locations within the curtain 120 to define desired inflation regions. By way of example only, in the embodiment of FIG. 2 the inflation cells cooperatively define a first inflation region 160 within a web portion 170 for disposition adjacent a front seated occupant and a second inflation region 162 for disposition adjacent a rear seated occupant. In order to reduce inflation requirements, the first and second inflation regions may be separated by a non-inflatable region 164 for disposition at a location between front and rear seated occupants. In the event that the vehicle of interest incorporates additional seating rows, it is contemplated that additional inflation regions (not shown) can be added for each row with additional non-inflatable regions separating the adjacent inflation regions.

The use of two or more inflators that each deliver inflation gas to discrete gas accepting portions of the curtain may provide several advantages. One potential advantage is the ability to substantially maintain desired inflation and tension characteristics even if one of the gas accepting portions is damaged. By way of example, in the event of puncture or tearing in the gas transmission bolster 144 and/or in one or more cell members in the first group of inflation cells 146, a substantial degree of cushioning and tensioning restraint is still provided by the second group of inflation cells 156 and the lower edge tensioning cell 154. Likewise, in the event of puncture or tearing in the tensioning cell 154, and/or in one or more cell members in the second group of inflation cells 156, a substantial degree of cushioning and tensioning restraint is still provided by the first group of inflation cells 146.

In addition to the ability to maintain protection in the event of tearing or puncture, the use of discrete gas accepting portions in fluid communication with dedicated inflators also allows the selection of appropriate inflators to achieve desired performance characteristics in different portions of the curtain 120. By way of example only, in the configuration illustrated in FIG. 2, the first inflator 142 may be sized to achieve an initial rapid inflation of the gas transmission bolster 144 and first group of inflation cells to protect an occupant during an initial impact. The second inflator 152 may be sized to achieve a more prolonged inflation to provide tensioning and continued cushioning restraint during a subsequent roll-over. Thus, combinations of inflators may be used to provide greater flexibility in design.

Another embodiment of an air bag curtain 220 in accordance with the present invention is shown in FIG. 3, wherein elements corresponding to those previously described are designated by like reference numerals within a 200 series. In this embodiment the curtain 220 includes a first mouth opening 240 operatively connected to a first inflator 242. As illustrated, the first inflator 242 is dedicated to delivery of inflation gas into the first mouth opening 240 and thereafter through a gas transmission bolster 244 and into a first group of inflation cells 246 branching off of the far end of the bolster 244.

According to the illustrated and potentially preferred practice, the curtain 220 also includes a second mouth opening 250 operatively connected to a second inflator 252. As illustrated, the second inflator 252 is dedicated to delivery of inflation gas into the second mouth opening 250, through an inflatable tensioning cell 254 disposed adjacent the lower edge of the curtain and into a second group of inflation cells 256. As shown, in this embodiment one member of the second group of inflation cells 256 may be arranged to act as a conduit between the mouth opening 250 and the tensioning channel 254 while other members may branch off of the far end of the tensioning channel 254.

In the embodiment of FIG. 3 the inflation cells 256 cooperatively define a first inflation region 260 within a web portion 270 for disposition adjacent a front seated occupant and the inflation cells 246 make up a portion of a second inflation region 262 for disposition adjacent a rear seated occupant. In order to reduce inflation requirements, the first and second inflation regions may be separated by a non-inflatable region 264 for disposition at a location between front and rear seated occupants. In the event that the vehicle of interest incorporates additional seating rows, it is contemplated that additional inflation regions (not shown) can be added for each row with additional non-inflatable regions separating the adjacent inflation regions. It is contemplated that the arrangement illustrated in FIG. 3 may provide preferential early inflation along the upper and lower edges of the curtain 220 with balanced inflation along the interior.

The concepts of the present invention may aid in optimizing inflation characteristics by matching inflators with different portions of the curtain. That is, since portions of the curtain are inflated by dedicated inflators, the inflators can be sized based on the specific inflation characteristics desired. By way of example only, and not limitation, it is contemplated that a first inflator may be used to inflate cushioning portions of a curtain while a second inflator may be substantially dedicated to the delivery of gas to tensioning portions of the curtain.

FIG. 4 illustrates an embodiment of an air bag curtain 320 with a first inflator 342 used predominately for cushioning and a second inflator 352 used predominately for tensioning. As will be appreciated, elements corresponding to those previously described are designated by like reference numerals within a 300 series. In the embodiment of FIG. 4, the curtain 320 includes a first mouth opening 340 operatively connected to a first inflator 342. As illustrated, the first inflator 342 is dedicated to delivery of inflation gas into the first mouth opening 340 and thereafter through an upper edge gas transmission bolster 344 and into inflation cells 346 branching off of the gas transmission bolster 344. As shown, the inflation cells may be arranged in a desired pattern along the length of the curtain. Upon activation of the first inflator 342, the gas transmission bolster 344 and the first group of inflation cells 346 are rapidly inflated to provide impact protection. The inflation of the first group of inflation cells 346 also causes the curtain to unfold downwardly away from its stored position along the vehicle roof rail.

By way of example only, in the embodiment of FIG. 4 the inflation cells 346 cooperatively define a first inflation region 360 within a web portion 370 for disposition adjacent a front seated occupant and a second inflation region 362 for disposition adjacent a rear seated occupant. In order to reduce inflation requirements, the first and second inflation regions may be separated by a non-inflatable region 364 for disposition at a location between front and rear seated occupants. In the event that the vehicle of interest incorporates additional seating rows, it is contemplated that additional inflation regions (not shown) can be added for each row with additional non-inflatable regions separating the adjacent inflation regions.

According to the illustrated and potentially preferred practice, the curtain 320 also includes a second mouth opening 350 operatively connected to a second inflator 352. As illustrated, the second inflator 352 is dedicated to delivery of inflation gas into the second mouth opening 350, for transmission along a flow path to an inflatable tensioning cell 354 disposed adjacent the lower edge of the curtain. As shown, in this embodiment an inflation cell 356 having an inlet and an outlet may be arranged to act as a conduit between the mouth opening 350 and the tensioning cell 354. However, in the illustrated embodiment the tensioning cell is isolated from 20 additional inflation cells. Thus, gas from the second inflator 352 is used substantially to maintain tension across the lower edge so as to hold the curtain 320 in place. The low volume of the regions inflated by the second inflator 352 facilitates rapid early stage inflation while nonetheless using a relatively small gas volume. As with the embodiments described earlier, due to the isolated regions of the curtain 320, substantial operability is retained even if a segment of the curtain is damaged.

FIG. 5 illustrates another embodiment of an air bag curtain 420 with a first inflator 442 used predominately for cushioning and a second inflator 452 used predominately for tensioning. As will be appreciated, elements corresponding to those previously described are designated by like reference numerals within a 400 series. In the embodiment of FIG. 5, the curtain 420 includes a first mouth opening 440 operatively connected to a first inflator 442. As illustrated, the first inflator 442 is dedicated to delivery of inflation gas into the first mouth opening 440 and thereafter through a gas transmission bolster 444 and into inflation cells 446 branching off of the gas transmission bolster 444. As in previous embodiments, the gas transmission bolster 444 is preferably arranged for disposition in the vicinity of the vehicle roof rail. The inflation cells may be arranged in a desired pattern along the length of the curtain. Upon activation of the first inflator 442, the gas transmission bolster 444 and the inflation cells 446 are rapidly inflated to provide impact protection. The inflation of the cells 446 also causes the curtain to unfold downwardly away from its stored position along the vehicle roof rail.

By way of example only, in the embodiment of FIG. 5 the inflation cells 446 cooperatively define a first inflation region 460 for disposition adjacent a front seated occupant and a second inflation region 462 for disposition adjacent a rear seated occupant. In order to reduce inflation requirements, the first and second inflation regions may be separated by a non-inflatable region 464 for disposition at a location between front and rear seated occupants. In the event that the vehicle of interest incorporates additional seating rows, it is contemplated that additional inflation regions (not shown) can be added for each row with additional non-inflatable regions separating the adjacent inflation regions.

According to the illustrated and potentially preferred practice, the curtain 420 also includes a second mouth opening 450 operatively connected to a second inflator 452. As illustrated, the second inflator 452 is dedicated to delivery of inflation gas into the second mouth opening 450, for transmission along a flow path to a closed end inflatable tensioning cell 454. As shown, in this embodiment an inflation cell 456 having an inlet and an outlet may be arranged to act as a conduit between the mouth opening 450 and the tensioning cell 454.

In the illustrated embodiment the inflation cell 456 and the tensioning cell 454 are spaced apart from the inflatable web portion 470 housing the inflation cells 446. This spacing is maintained by an arrangement of straps or tethers 472, 474 such as segments of fabric or the like. Such straps or tethers may extend between perimeter edges of the joined components and may be held in place by attachment mechanisms such as sewn seams, welded seams, adhesive seams, grommets or the like. As will be appreciated, such elements transfer tension forces without requiring inflation. Thus, the curtain 420 may require a lower volume of inflation gas and/or cover a larger area. Moreover, such a configuration allows the tensioning cell 454 and associated conduit portions to be formed separately from the inflatable web portion 470. Such separate formation may be desirable in some instances.

FIG. 6 illustrates another embodiment of an air bag curtain 520 utilizing a single inflator 542 to inflate discrete impact and tensioning zones. As will be appreciated, elements corresponding to those previously described are designated by like reference numerals within a 500 series. In the embodiment of FIG. 6, an upper edge gas transmission bolster 544 is adapted to receive inflation gas from an inflator 542. While the inflator 542 is illustrated in a central location along the gas transmission bolster, it is likewise contemplated that the inflator may be placed at any other location inside or outside the curtain 520 as may be desired. As illustrated, the inflator 542 delivers inflation gas into the gas transmission bolster 544 and inflation cells 546 branching off of the gas transmission bolster 544. Thus, upon activation of the inflator 542, the gas transmission bolster 544 and the attached inflation cells are rapidly inflated to provide impact protection. The inflation of the cells 546 also causes the curtain to unfold downwardly away from its stored position along the vehicle roof rail.

As illustrated, In the embodiment of FIG. 6, a one way flow valve 575 is disposed along the flow path of inflation gas expelled by the inflator 542. The flow valve 575 permits one way transmission of inflation gas into a lower edge tensioning cell 554. However, the flow valve substantially blocks any gas return from the lower edge tensioning cell 554. Thus, a single inflator 542 may be used to initially inflate substantially the entire curtain 520 while still permitting inflation to be retained within discrete zones independent of other zones after inflation has been achieved. Of course, the actual placement of the flow valve may be at any location along the inflation gas flow path a may be desired.

It is also contemplated that the flow valve 575 may be selectively utilized to achieve a sequential inflation of different regions of the curtain if desired. By way of example only, it is contemplated that the flow valve 575 may be opened only after a predefined pressure is reached within the upstream portions of the curtain. Thus, early initial stage inflation of the gas transmission bolster 544 and upstream inflation cells 546 may be completed before gas is delivered through the flow valve to the lower edge tensioning cell. Such staged inflation may be desirable in some situations.

As in prior illustrated embodiments, it is contemplated that the inflation cells 546 may cooperatively define discrete inflation regions across the length of the curtain 520 corresponding to regions adjacent seated occupants. These discrete inflation regions may be separated by a non-inflatable region 564 within the curtain web 570 for disposition at a location between occupant seating rows. Of course, in the event that the vehicle of interest incorporates additional seating rows, it is contemplated that additional inflation regions (not shown) can be added for each row with additional non-inflatable regions separating the adjacent inflation regions.

As will be appreciated, seams between segments of material at the perimeter or interior of the curtain may be used to contain inflation gas and/or define desired flow paths for inflation gas. It is contemplated that at least a portion of the perimeter and/or interior seams may be sewn seams formed by passing sewing thread in a stitching arrangement between opposing panels. According to a potentially preferred practice, it is contemplated that sewn seams may incorporate a construction adapted to greatly reduce the propensity for gas leakage under the stress of inflated deployment. By way of example only, and not limitation, an illustrative gas blocking seam construction such as may be used is illustrated in FIG. 7. While the seam is illustrated as utilizing multiple parallel sewing threads, such an arrangement is illustrative only and virtually any seamed construction may be utilized. For example, a single needle lock stitch may be utilized if desired. Moreover as will be appreciated, in order to facilitate explanation, various components of the seam are shown with enhanced dimensions and are thus not necessarily drawn to scale.

As shown, in the exemplary seam construction a first panel 75 formed from a blank of suitable construction material such as a woven fabric or the like is joined to a second panel 76 formed from a blank of suitable construction material such as a woven fabric or the like along a seam line 78 by suitable stitching threads 80. In the illustrated and potentially preferred practice, one or both of the panels 75, 76 includes a relatively light weight coating 82 of a strongly adherent permeability blocking composition across the inside surface. As will be appreciated, such coatings provide gas blockage across the non-seamed portions of the formed curtain. By way of example only, and not limitation, such coatings may include silicone, urethanes, disperse polyamides or the like. Silicone coatings having dry add on weights of about 10 to 50 grams per square meter, more preferably about 15 to about 34 grams per square meter and most preferably about 20 to about 25 grams per square meter may be particularly preferred. Of course, in the event that the panels 75, 76 have adequate permeability blocking character such coatings may be eliminated if desired.

Whether or not a permeability blocking coating 82 is utilized, at least a portion of the sewn seams preferably include a sealant layer 84 sandwiched between the panels 75,76 and at least partially surrounding the stitching threads 80. In practice, the sealant layer 84 preferably runs along the length of the seam and defines a plug having a thickness dimension parallel to the sewing threads and a discrete, relatively narrow width dimension transverse to the sewing threads. The width dimension is sufficient such that at least a portion of the stitching threads are surrounded by the plug.

As will be appreciated, when inflation gas is introduced, sewn seams are placed into tension as the adjoined panels attempt to separate from one another. FIG. 7A illustrates the seam of FIG. 7 under pressure with the panels pulling away from one another in the direction of the arrows. As illustrated, upon the application of pressure the seam attempts to separate at the base thereby causing the sealant layer 84 to be stretched away from the centerline. The maximum degree of stretch within the sealant layer 84 is at the base of the seam where the panels 75, 76 spread apart from one another. As illustrated in FIG. 7A, according to the present invention, during inflation the sealant layer 84 deforms along with the adjoined panels 75,76. The sealant layer 84 thereafter begins to fail in a cohesive manner with crack propagation stopping just short of the stitching threads 80.

It has been determined that the surface energy occurring during the formation of a crack dc may be written as follows as Tbdc, where T is the tear energy of the sealant and b is the width of the sealant specimen. Since there is no energy dissipation in this process, all the work is spent to create the crack, and hence:

$$2Fdl = Tbdc \ldots \quad (1)$$

Where F is the force pulling the adherent and, dl is the resultant change in length of the specimen. Since the fabric has a minimal elongation at this stage, dl=dc. Also, if the force per unit width is defined as f, then the above equation can be transformed into a simpler form:

$$2f = T \ldots \quad (2)$$

Hence, the tearing energy is substantially independent of the thickness of the sealant and is purely a function of the force per unit width of the seam. In this particular application the sealant should be chosen to fail in a cohesive manner. As a result, the tensile strength of the adhesive should not be high enough to shift this failure mode from cohesive to adhesive mode. The determination of the above theoretical parameters was carried out through peel testing of the sealant attached to the fabric adherent.

Based on experiments it has been found that the sealant band width of more than about 5 to 10 mm is not normally necessary. Surprisingly, it was found that large widths may actually be counterproductive because they begin to induce more of an adhesion failure (i.e. peeling away from the adjacent panel) rather than a preferred cohesive failure within the sealant. The effect of the sealant width was evaluated in the tensile tester in the peel configuration to mimic the deformation in an air bag. The thickness of the sealant was evaluated at 5 mm and 10 mm widths and also the effect of a sewn seam in this process was introduced to understand if the sealant was performing as designed. A new parameter referred to herein as "Performance Strength Ratio" or PSR was defined as follows in the design stages of the various sealants and was used as a discrimination parameter for gas retention in a curtain-type air bag:

$$PSR = \frac{Peel \cdot Strength \cdot of \cdot the \cdot sealant}{Tensile \cdot Strength \cdot of \cdot the \cdot Seam \cdot in \cdot the \cdot Cushion} \quad (3)$$

In the above ratio, the sealant by itself does not provide any tensile strength to the seam in the cushion, but the sewn seam does. As a result, a lower PSR ratio is preferred but at the same time it should not be too low to result in sealant peeling from the coating on the substrate prematurely. The peel strength and seam tensile strength are preferably measured in accordance with DIN EN ISO 13934-1.

Based on these parameters it has been determined that in order to achieve the desired mechanism of cohesive failure, the adhesive strength of the sealant is required to be higher than the cohesive sealant strength. Moreover, the sealant should preferably be immiscible and exhibit very low interfacial tension. In addition, the sealant material preferably adheres to the panels with a sufficient force to avoid peeling prematurely. By way of example, in order to achieve the desired performance character it is contemplated that for a typical sewn seam such as a single needle lock stitch having a tensile strength of about 178 pounds force per inch, the peel strength of the sealant is preferably about 10 to about 44 pounds force per inch such that the PSR is preferably in the range of about 0.05 to about 0.25, more preferably about 0.10 to about 0.20 and most preferably about 0.18 or less. The tearing energy for the sealant layer 84 is preferably less than about 75 lbs. force per inch as calculated from equation 2 above. In order to realize these characteristics it has been found that the tensile strength of the sealant is preferably less than about 2.5 MPa and more preferably in the range of about 1.5 to about 2.5 MPa when measured per JIS K6249 with a Shore hardness of less than about 25. The sealant should preferably exhibit the desired cohesive elongation and cohesive cleavage propagation even at thicknesses of less than about 1 millimeter. In actual practice the thickness of the sealant layer is preferably about 5 millimeters or less and is more preferably about 3 millimeters or less and is most preferably less than 1 millimeter.

In order to be practical for use in an air bag cushion, the material forming the sealant layer 84 is preferably curable at room temperature with gelation transition from a liquid phase to a solid rubber phase in about 150 minutes or less at room temperature (more preferably about 60 minutes or less) so as to permit seam formation between panels of material through the sealant layer within a relatively short period of time after sealant application. In actual practice, the sealant should remain in liquid form as it is applied and the initial sandwich is formed. Thereafter, the sealant should undergo gelation to a solid rubber phase prior to seaming. The ability to cure at room temperature avoids the need to subject the panels to elevated temperatures. As will be appreciated, exposure to elevated temperatures may be undesirable due to shrinkage of the panel substrate material.

After determining the desired performance and design parameters as outlined above, a number adhesive compositions were evaluated with the results outlined in Table 1 below.

TABLE 1

| Sealant Manufacturer | Sealant Part No. | Sealant Type | Curing Mechanism | Sealant Dimension Width x Thickness (mm) | Gelation Time (min) | Failure In Peel Test |
|---|---|---|---|---|---|---|
| Dow | CF6712 | 2-Part | RoomTemp/Heat | 10 × 1 | 240 | Cohesive |
| Shin Etsu | X831-070 | 2-Part | Room Temp | 10 × 1 | 1440 | Cohesive |
|  | X-32-2170 | 2-Part | Room Temp | 10 × 1 | 1440 | Both |
|  | X-30-2070 | 2-Part | Room Temp | 10 × 1 | 1440 | Cohesive |
| Wacker | 4001 | 1-Part | Heat | 10 × 1 | 1 | Adhesive |
|  | 3003 | 2-Part | Heat | 10 × 1 | 2 | Adhesive |
| Bayer-GE | TP3754 | 2-Part | Heat | 10 × 1 | 5 | Adhesive |
| Rhodia | LSRR20HS | 2-Part | Heat | 10 × 1 | 5 | Adhesive |
| Henkel |  | 1-Part | Room Temp | 10 × 1 | 10 | Cohesive |
| Henkel |  | 1-Part | Room Temp | 10 × 1 | 60 | Cohesive |

It was found that the one part condensation cured sealants provided by Henkel Corporation having a place of business at 1001 Trout Brook Crossing, Rocky Hill, Conn. may provide desirable performance characteristics when utilized in a proper manner. In particular such sealant materials are one-part systems that do not rely on addition curing. Moreover, such materials may be cured from liquid to a sufficiently solid rubber phase within about 10 to 60 minutes at room temperature. Most importantly, when properly applied within a seam structure such sealants exhibit the desired fully cohesive elongation and failure. Of course, it is contemplated that such sealants are exemplary only and that other sealants having the desired properties may likewise be utilized.

One contemplated advantage of curtain constructions utilizing discrete inflation zones for impact and lower edge tensioning is the ability to selectively utilize reduced permeability seams as described above at desired locations to achieve performance characteristics during different stages of a crash event. In particular, it has been found that by using sewn seams with gas blocking sealant layer 84 to define the boundaries of the lower edge tensioning cell and other cells in fluid communication with the lower edge tensioning cell, that tension can be maintained within the curtain for an extended length of time. Likewise, by using standard gas permeable sewn seams at locations not in fluid communication with the lower edge tensioning cell, the inflation gas may be permitted to escape after the period of initial impact is concluded. Thus, the portion of the curtain used for head impact protection may be permitted to depressurize within a much shorter period than the tensioning cell. Since the zones are isolated from one another, depressurization within one zone is independent of depressurization in the other.

By way of example only, and not limitation, it has been found that by using the seam constructions as described in combination with isolated inflation zone arrangements, that inflation pressure can be maintained within the tensioning zone for periods in excess of about 3 seconds while gas may be exhausted from the head impact zones in less than 3 seconds. As will be appreciated by those of skill in the art, this permits a substantial degree of freedom in the development of particular performance characteristics within the curtain. In particular, it allows potentially desirable early stage head impact protection in combination with extended tensioning while using low permeability seams in only a portion of the curtain.

Of course, it is to be understood that curtain constructions in accordance with the present invention are in no way limited to the use of sewn seams. To the contrary, it is contemplated that any number of other joining techniques may be utilized to form gas containment and flow blocking elements. By way of example, such joining techniques may include woven seams or joints, adhesive seams or joints, welded seams or joints and the like.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. Therefore, it is intended that the present invention shall extend to all such modifications and variations as may incorporate the broad aspects of the invention in the full spirit and scope thereof.

What is claimed is:

1. An inflatable air bag curtain for occupant protection in a transportation vehicle, the air bag curtain comprising:

(a) a first mouth opening adapted to accept inflation gas generated by a first gas emitting inflator, the first mouth opening being in fluid communication with a gas transmission bolster portion of the curtain, said gas transmission bolster portion disposed adjacent an upper edge of the curtain; and (b) at least a second mouth opening adapted to accept inflation gas generated by a second gas emitting inflator, the second mouth opening being in fluid communication with an inflatable tensioning cell disposed adjacent a lower edge of the curtain, (c) wherein the gas transmission bolster portion is in fluid isolation from the inflatable tensioning cell such that inflation within the gas transmission bolster portion is maintained independently from inflation within the inflatable tensioning cell;

(d) wherein the air bag curtain includes one or more sewn seams comprising at least one stitching thread extending in perforating relation between a first panel and a second panel;

(e) whereby discrete segments of the first panel and the second panel are held in opposing relation to one another, wherein a coating layer of a permeability blocking composition is affixed to at least one of the first and second panels of only the inflatable tensioning cell portion of the air bag curtain, said coating layer being positioned between the first and second panels in the region of the stitching thread;

(f) further wherein a layer of gas blocking sealant of discrete width is disposed between said discrete segments of the first panel and the second panel of only the inflatable tensioning cell portion of the air bag curtain in surrounding relation to said at least one stitching thread, the gas blocking sealant being in contact with the coating layer, the gas blocking sealant forming an adhesive bond to the first panel and the second panel with adhesive strength in excess of the internal cohesive strength of the sealant, wherein the gas blocking sealant is room temperature cured; and, wherein the inflatable tensioning cell portion of the air bag curtain remains inflated for about 6 seconds or more.

2. The inflatable air bag curtain invention as recited in claim 1, wherein the coating layer comprises silicone.

3. The inflatable air bag curtain invention as recited in claim 1, wherein the layer of gas blocking sealant has a width of less than 10 millimeters and a thickness not greater than 1 millimeter.

* * * * *